UNITED STATES PATENT OFFICE.

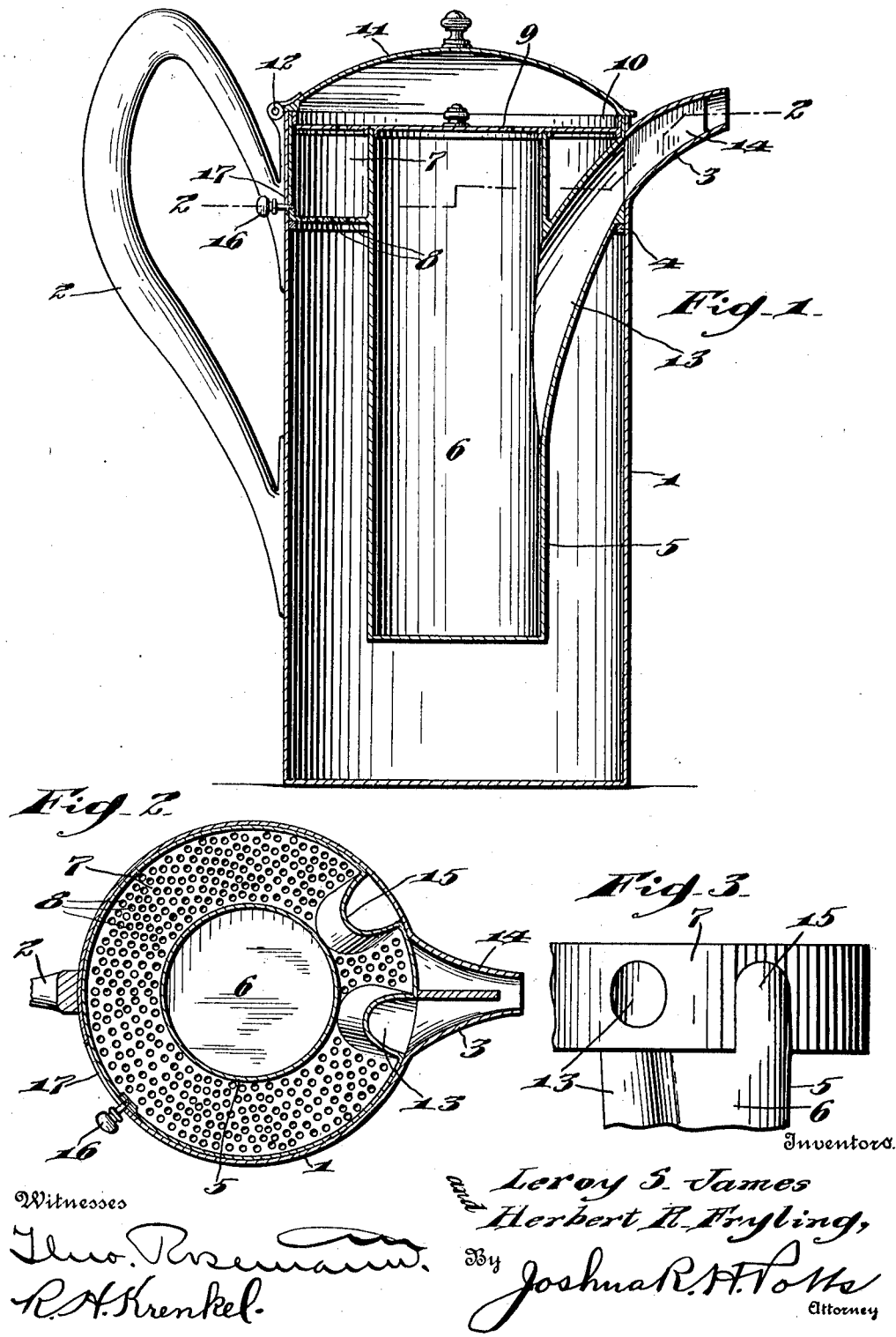

LEROY S. JAMES, OF ALDAN, PENNSYLVANIA, AND HERBERT R. FRYLING, OF OAKLEY, NEW JERSEY.

COMBINED COFFEE AND TEA POT.

1,035,444.  Specification of Letters Patent.  Patented Aug. 13, 1912.

Application filed November 27, 1911. Serial No. 662,763.

*To all whom it may concern:*

Be it known that we, LEROY S. JAMES and HERBERT R. FRYLING, citizens of the United States, residing at Aldan, county of Delaware, and State of Pennsylvania, and Oakley, county of Camden, and State of New Jersey, have invented certain new and useful Improvements in Combined Coffee and Tea Pots, of which the following is a specification.

Our invention relates to improvements in combined coffee and tea pots, the object of the invention being to provide in a single device, a compartment for tea, and a compartment for coffee, and provide improved means which may be operated so that either tea or coffee may be poured from the spout of the device.

A further object is to provide an improved device of this character which may be manufactured and sold at a reasonably low price, and which will occupy no more space than an ordinary coffee pot, yet will contain both coffee and tea.

With these and other objects in view, the invention consists in certain novel features of construction, and combinations and arrangements of parts, as will be more fully hereinafter described and pointed out in the claims.

In the accompanying drawings: Figure 1, is a view in vertical section illustrating our improvements. Fig. 2, is a view in section on the line 2—2 of Fig. 1, and Fig. 3, is a broken view in elevation illustrating the movable member.

1, represents a cylindrical receptacle having a handle 2 and a fixed spout 3. The receptacle 1, at its upper end, is provided with an integral flange 4 upon which is supported the annularly enlarged upper end of our improved internal member 5. This internal member 5 constitutes a tea receptacle 6 of general cylindrical form, supported centrally in the receptacle 1, and having an annular chamber 7 formed in the said annular enlargement around the upper end of the internal member 5. The bottom of this chamber 7 is perforated as shown at 8, and a removable cover 9 is provided which fits snugly the upper end of receptacle 6, and also forms a cover for the annular chamber 7. This cover 9 has an upwardly projecting flange 10 all around its edge, against which a cover 11 on the receptacle 1 is adapted to bear. This cover 11 is connected to the receptacle 1 by a hinge 12, and when closed, serves to firmly hold the cover 9 in position. The receptacle 6 is provided with an outlet spout section 13, which extends through the chamber 7, and is adapted to register with the spout 3, said spout 3 having a longitudinal partition 14 as clearly shown. A passage 15 is also provided through the chamber 7, which passage constitutes an outlet for the coffee from the receptacle 1. This passage 15 is formed by an integral curved partition or tube which forms a part of the chamber 7, yet acts as a conduit or passage from the receptacle 1 to the spout, and by the use of the term "passage" in the claims, we use such term to identify this portion of the structure which forms communication between the receptacle 1 and the spout 3.

By reference particularly to Fig. 2, it will be seen that the spout 13 and the passage 15 are so located that but one may be registered with the spout 3 at a time, and these passages 13 and 15 are of a width corresponding to one half of the width of the spout at its inner end. To turn the inner member so as to move either the spout section 13 or passage 15 into registering with the spout 3, an outwardly projecting knob 16 is provided, and secured to the outer wall of chamber 7 and movable through a slot 17 in receptacle 1. This slot 17 is of such a length that when the knob is moved from one end of the slot to the other, the inner member will be moved a distance sufficient to move either the spout section 13 or the passage 15 into register with spout 3. The partition 14 serves to prevent coffee or tea becoming mixed in the spout. In other words, in pouring coffee, the partition 14 compels the coffee to pass down the spout and not over into the tea side of the spout, as will be readily understood.

In operation, the coffee is placed in the annular chamber 7, water in the receptacle 1, and tea and water in the receptacle 6. The tea, of course, will steep in the receptacle 6, while the steam from the water in receptacle 1 will pass through the perforated bottom 8 into contact with the coffee in chamber 7, and the steam in said chamber 7 will condense and drop back through the perforated bottom 8, after becoming impregnated with the coffee and fall into the water below. The water in receptacle 1 therefore becomes thoroughly impregnated with the coffee, and is ready for use. The device may be shifted by means of the knob 16, so that either coffee or tea may be poured from the spout 3 in accordance with which of the outlets 13 or 15 register with the spout as above explained.

Various slight changes might be made in the general form and arrangement of parts described without departing from our invention, and hence we do not limit ourselves to the precise details set forth, but consider ourselves at liberty to make such changes and alterations as fairly fall within the spirit and scope of the appended claims.

Having thus described our invention, what we claim as new and desire to secure by Letters Patent is:

1. A combined coffee and tea pot comprising an outer receptacle, a spout on said outer receptacle, an inner rotary member comprising a centrally located tea receptacle having an annular flange near its upper end, and an integral vertical wall at the outer edge of the flange fitting within the outer receptacle, and forming a chamber adapted to contain coffee, the bottom of said chamber being perforated and communicating with the outer receptacle, a spout section on said inner receptacle, and a wall extending through the coffee chamber and forming a passage therethrough communicating with the outer receptacle and with the spout, and means for moving said inner member to move either the spout section of the inner receptacle or said last-mentioned passage into communication with the spout of said outer receptacle, substantially as described.

2. A combined coffee and tea pot, comprising an outer receptacle having an internal flange, a spout on said outer receptacle, an inner member comprising a central receptacle, and an annular flange near its upper end, and an integral vertical wall at the outer edge of the flange supported on said flange, said flange and outer wall forming a coffee chamber having a perforated bottom, a spout section communicating with the inner receptacle and adapted to register with the spout on the outer receptacle, a wall extending through the coffee chamber and forming a passage therethrough connecting the outer receptacle with the spout, and means for turning said inner member on the flange, substantially as described.

3. A combined coffee and tea pot, comprising an outer receptacle having an internal flange, a spout on said outer receptacle, an inner member comprising a central receptacle, and an annular flange near its upper end, and an integral vertical wall at the outer edges of the flange supported on said flange, said flange and outer wall forming a coffee chamber having a perforated bottom, a spout section communicating with the inner receptacle and adapted to register with the spout on the outer receptacle, and a wall extending through the coffee chamber and forming a passage therethrough connecting the outer receptacle with the spout, said outer receptacle having a slot therein, and a knob outside of said receptacle projected through said slot and secured to said inner member, whereby said inner member may be turned by moving the knob, substantially as described.

4. A combined coffee and tea pot, comprising an outer receptacle having an internal flange, a spout on said outer receptacle, an inner member comprising a central receptacle, and an annular flange near its upper end, and an integral vertical wall at the outer edge of the flange supported on said flange, said flange and said outer wall comprising an annular chamber having a perforated bottom, a spout section communicating with the inner receptacle and adapted to register with the spout on the outer receptacle, a wall extending through the coffee chamber and forming a passage therethrough connecting the outer receptacle with the spout, means for turning said inner member on the flange, a cover on the inner receptacle and the annular chamber, and a hinged cover on said outer receptacle, having a flange thereon resting on said inner cover, substantially as described.

5. A combined coffee and tea pot, comprising an outer receptacle having an internal flange, a spout on said outer receptacle, an inner member comprising a central receptacle, and an annular flange near its upper end, and an integral vertical wall at the outer edge of the flange supported on said flange, said flange and said outer wall comprising an annular chamber having a perforated bottom, a spout section communicating with the inner receptacle and adapted to register with the spout on the outer receptacle, a wall extending through the coffee chamber and forming a passage therethrough connecting the outer receptacle with the spout, a cover on the inner receptacle and the annular chamber, and a hinged cover on said outer receptacle, having a flange thereon resting on said inner cover, substantially as described.

In testimony whereof we have signed our names to this specification in the presence of two subscribing witnesses.

LEROY S. JAMES.
HERBERT R. FRYLING.

Witnesses:
CHAS. E. POTTS,
C. R. ZIEGLER.